US011042279B2

(12) United States Patent
Mackinlay et al.

(10) Patent No.: US 11,042,279 B2
(45) Date of Patent: Jun. 22, 2021

(54) GENERATING GRAPHICAL MARKS FOR GRAPHICAL VIEWS OF A DATA SOURCE

(71) Applicant: Tableau Software, Inc., Seattle, WA (US)

(72) Inventors: Jock Douglas Mackinlay, Bellevue, WA (US); Christopher Richard Stolte, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

(21) Appl. No.: 16/590,331

(22) Filed: Oct. 1, 2019

(65) Prior Publication Data

US 2020/0034029 A1    Jan. 30, 2020

Related U.S. Application Data

(63) Continuation of application No. 15/444,200, filed on Feb. 27, 2017, now Pat. No. 10,430,059, which is a
(Continued)

(51) Int. Cl.
*G06F 3/048* (2013.01)
*G06F 3/0484* (2013.01)
(Continued)

(52) U.S. Cl.
CPC ...... *G06F 3/04847* (2013.01); *G06F 3/04817* (2013.01); *G06F 3/04842* (2013.01);
(Continued)

(58) Field of Classification Search
CPC .............. G06F 3/0482; G06F 3/04847; G06F 3/04817; G06F 3/04842
See application file for complete search history.

(56) References Cited

U.S. PATENT DOCUMENTS 5,383,029 A    1/1995 Kojima
5,392,395 A *  2/1995 Fujii ..................... G06F 11/328
                                                  345/536
(Continued)

FOREIGN PATENT DOCUMENTS

WO    WO 97/12334    4/1997

OTHER PUBLICATIONS

Anand, Office Action, U.S. Appl. No. 14/242,843, dated Dec. 16, 2015, 12 pgs.
(Continued)

*Primary Examiner* — Nicholas Augustine
(74) *Attorney, Agent, or Firm* — Morgan, Lewis & Bockius LLP

(57) ABSTRACT

A method displays a user interface for a graphical view application. The user interface includes shelves for specifying graphical views of a dataset. A user associates first and second fields of the dataset with first and second shelves. In response, the method displays graphical views in the user interface according to the first and second fields. Each of the graphical views corresponds to a respective distinct value of the second field and each of the graphical views includes a set of graphical marks. When the first shelf defines color encoding, each graphical mark has a respective color that corresponds to a respective data value associated with the first field. When the first shelf defines size encoding, each graphical mark has a respective size that corresponds to a respective data value associated with the first field.

20 Claims, 7 Drawing Sheets

Related U.S. Application Data continuation of application No. 14/487,016, filed on Sep. 15, 2014, now Pat. No. 9,933,928, which is a continuation of application No. 12/214,818, filed on Jun. 22, 2008, now Pat. No. 8,860,754.

(51) Int. Cl.
   *G06T 11/00* (2006.01)
   *G06T 11/20* (2006.01)
   *G06T 17/05* (2011.01)
   *G06F 3/0481* (2013.01)
   *G06F 3/01* (2006.01)

(52) U.S. Cl.
   CPC ............ *G06T 11/00* (2013.01); *G06T 11/206* (2013.01); *G06T 17/05* (2013.01)

(56) References Cited

U.S. PATENT DOCUMENTS

| | | | |
|---|---|---|---|
| 5,467,441 A * | 11/1995 | Stone .................... | G06T 3/0018 345/619 |
| 5,581,677 A | 12/1996 | Myers et al. | |
| 5,710,899 A * | 1/1998 | Eick .................... | G06F 3/04847 715/708 |
| 5,751,931 A * | 5/1998 | Cox .................... | G06T 11/206 345/419 |
| 5,850,531 A * | 12/1998 | Cox .................... | G06F 3/04847 715/781 |
| 5,864,856 A | 1/1999 | Young | |
| 6,101,496 A * | 8/2000 | Esposito ................ | G01C 21/32 701/532 |
| 6,144,962 A * | 11/2000 | Weinberg ................ | G06F 11/32 |
| 6,301,579 B1 | 10/2001 | Becker | |
| 6,678,615 B2 * | 1/2004 | Howard ................ | G06Q 10/06 702/5 |
| 6,725,230 B2 | 4/2004 | Ruth et al. | |
| 6,750,864 B1 | 6/2004 | Anwar | |
| 7,089,266 B2 * | 8/2006 | Stolte .................... | G06F 40/18 707/769 |
| 7,379,601 B2 | 5/2008 | Yang et al. | |
| 7,716,225 B1 | 5/2010 | Dean et al. | |
| 7,925,982 B2 * | 4/2011 | Parker .................... | G06F 16/29 715/748 |
| 8,060,497 B1 | 11/2011 | Zatsman et al. | |
| 8,677,235 B2 | 3/2014 | Chronister et al. | |
| 8,812,947 B1 | 8/2014 | Maoz et al. | |
| 9,348,881 B1 * | 5/2016 | Hao ........................ | G06F 16/00 |
| 2003/0144868 A1 * | 7/2003 | MacIntyre ......... | G06Q 10/0637 705/7.38 |
| 2004/0078143 A1 * | 4/2004 | Howard ................ | G06Q 10/06 702/5 |
| 2004/0183800 A1 | 9/2004 | Peterson | |
| 2004/0243593 A1 * | 12/2004 | Stolte .................... | G06F 16/212 |
| 2005/0060300 A1 | 3/2005 | Stolte et al. | |
| 2005/0099423 A1 | 5/2005 | Brauss | |
| 2006/0100912 A1 * | 5/2006 | Kumar .................. | G06F 16/951 705/4 |
| 2006/0174209 A1 * | 8/2006 | Barros .................. | G06F 3/0483 715/764 |
| 2006/0206512 A1 * | 9/2006 | Hanrahan .............. | G06T 11/206 |
| 2007/0061611 A1 | 3/2007 | Mackinlay et al. | |
| 2007/0073722 A1 | 3/2007 | Ramer et al. | |
| 2007/0171716 A1 * | 7/2007 | Wright .................. | G06T 11/206 365/185.12 |
| 2007/0211056 A1 * | 9/2007 | Chakraborty ......... | G06T 11/206 345/440 |
| 2007/0245238 A1 * | 10/2007 | Fugitt .................... | G06F 3/0481 715/700 |
| 2007/0250523 A1 | 10/2007 | Beers et al. | |
| 2008/0065634 A1 * | 3/2008 | Krinsky .............. | G06F 16/9577 |
| 2008/0082348 A1 | 4/2008 | Paulus et al. | |
| 2008/0117213 A1 | 5/2008 | Cirit et al. | |
| 2008/0163085 A1 * | 7/2008 | Subbu .................... | G06F 9/451 715/763 |
| 2008/0243785 A1 * | 10/2008 | Stading .............. | G06F 16/9535 |
| 2008/0262327 A1 | 10/2008 | Kato | |
| 2009/0231340 A1 | 9/2009 | Savornin | |
| 2013/0135343 A1 * | 5/2013 | Nielsen .................. | G06F 16/29 345/619 |
| 2013/0254072 A1 * | 9/2013 | Eraker .................... | G06Q 30/00 705/26.64 |
| 2013/0254670 A1 * | 9/2013 | Eraker .................... | G06Q 30/00 715/738 |
| 2015/0019958 A1 | 1/2015 | Ying et al. | |

OTHER PUBLICATIONS

Anand, Notice of Allowance, U.S. Appl. No. 14/242,843, dated Dec. 20, 2016, 7 pgs.
Anand, Office Action, U.S. Appl. No. 14/242,857, dated Feb. 9, 2016, 11 pgs.
Anand, Final Office Action, U.S. Appl. No. 14/242,857, dated Aug. 8, 2016, 12 pgs.
Anand, Office Action, U.S. Appl. No. 14/242,857, dated Aug. 21, 2019, 16 pgs.
Anand, Office Action, U.S. Appl. No. 14/242,849, dated Jan. 5, 2016, 11 pgs.
Anand, Notice of Allowance, U.S. Appl. No. 14/242,849, dated May 26, 2016, 8 pgs.
MacKinlay, Office Action, U.S. Appl. No. 12/214,818, dated Mar. 28, 2011, 17 pgs.
MacKinlay, Final Office Action, U.S. Appl. No. 12/214,818, dated Oct. 26, 2011, 16 pgs.
MacKinlay, Office Action, U.S. Appl. No. 12/214,818, dated Apr. 13, 2012, 16 pgs.
MacKinlay, Final Office Action, U.S. Appl. No. 12/214,818, dated Jan. 3, 2013, 19 pgs.
MacKinlay, Office Action, U.S. Appl. No. 12/214,818, dated Jul. 11, 2013, 20 pgs.
MacKinlay, Final Office Action, U.S. Appl. No. 12/214,818, dated Feb. 20, 2014, 22 pgs.
MacKinlay, Notice of Allowance, U.S. Appl. No. 12/214,818, dated May 13, 2014, 9 pgs.
MacKinlay, Office Action, U.S. Appl. No. 15/444,200, dated Mar. 21, 2019, 11 pgs.
MacKinlay, Notice of Allowance, U.S. Appl. No. 15/444,200, dated Jul. 12, 2019, 8 pgs.
MacKinlay, Final Office Action, U.S. Appl. No. 14/549,482, dated Mar. 10, 2016, 11 pgs.
MacKinlay, Office Action, U.S. Appl. No. 14/487,016, dated Sep. 28, 2016, 9 pgs.
MacKinlay, Final Office Action, U.S. Appl. No. 14/487,016, dated Apr. 18, 2017, 12 pgs.
MacKinlay, Notice of Allowance, U.S. Appl. No. 14/487,016, dated Dec. 21, 2017, 9 pgs.
Ihm, Sun-Young, "App Analytic: A Study on Correlation Analysis of App Ranking Data," Sep. 30, 2013, IEEE Third International Conference on Cloud and Green Computing, 3 pgs.
Tableau Software, Inc., International Search Report, PCT/US2015/018475, dated May 8, 2015, 9 pgs.
Tableau Software, Inc., International Preliminary Report on Patentability, PCT/US2015/018475, dated Oct. 4, 2016, 6 pgs.

* cited by examiner

| Store ID 102 | City 104 | State 106 | ZIP 108 | Latitude 110 | Longitude 112 | Market 114 | Inventory 116 | Type 118 | ... |
|---|---|---|---|---|---|---|---|---|---|
| 1 | Seattle | WA | 98109 | 47.6 | -122.3 | Northwest | 632 | Decaf | ... |
| 1 | Seattle | WA | 98109 | 47.6 | -122.3 | Northwest | 854 | Regular | ... |
| 2 | Portland | OR | 97209 | 45.5 | -122.7 | Northwest | 548 | Decaf | ... |
| 2 | Portland | OR | 97209 | 45.5 | -122.7 | Northwest | 682 | Regular | ... |
| 3 | Los Angeles | CA | 90049 | 34.0 | -118.2 | West | 720 | Decaf | ... |
| 3 | Los Angeles | CA | 90049 | 34.0 | -118.2 | West | 594 | Regular | ... |
| 4 | San Diego | CA | 92111 | 32.7 | -117.2 | West | 668 | Decaf | ... |
| 4 | San Diego | CA | 92111 | 32.7 | -117.2 | West | 371 | Regular | ... |
| 5 | Chicago | IL | 60605 | 41.8 | -87.6 | Midwest | 593 | Decaf | ... |
| 5 | Chicago | IL | 60605 | 41.8 | -87.6 | Midwest | 611 | Regular | ... |
| 6 | St. Louis | MO | 63144 | 38.6 | -90.2 | Midwest | 486 | Decaf | ... |
| 6 | St. Louis | MO | 63144 | 38.6 | -90.2 | Midwest | 518 | Regular | ... |
| ... | ... | ... | ... | ... | ... | ... | ... | ... | ... |

Dataset 100, columns 122-1 through 122-12

Figure 1

Table of Data Samples 200
(Generated from Dataset 100)

| State | Latitude | Longitude | SUM(Inventory) | Type | |
|---|---|---|---|---|---|
| WA | 47.9 | -121.6 | 2465 | Decaf | 220-1 |
| WA | 47.9 | -121.6 | 3876 | Regular | 220-2 |
| OR | 44.9 | -121.8 | 3396 | Decaf | 220-3 |
| OR | 44.9 | -121.8 | 3744 | Regular | 220-4 |
| CA | 37.2 | -119.6 | 5820 | Decaf | 220-5 |
| CA | 37.2 | -119.6 | 5259 | Regular | 220-6 |
| IL | 31.0 | -117.9 | 2128 | Decaf | 220-7 |
| IL | 31.0 | -117.9 | 2337 | Regular | 220-8 |
| MO | 41.4 | -88.4 | 1822 | Decaf | 220-9 |
| MO | 41.4 | -88.4 | 1936 | Regular | 220-10 |

Columns: 202, 204, 206, 208, 210

Figure 2

GENERATING GRAPHICAL MARKS FOR GRAPHICAL VIEWS OF A DATA SOURCE

RELATED APPLICATIONS

This application is a continuation of U.S. patent application Ser. No. 15/444,200, filed Feb. 27, 2017, entitled "Methods and Systems of Generating Graphical Marks in a Graphical View Region of a User Interface," which is a continuation of U.S. patent application Ser. No. 14/487,016, filed Sep. 15, 2014, entitled "Selecting the Type of Visual Marks in Data Visualizations Based on User-Selected Visual Properties of the Marks," now U.S. Pat. No. 9,933,928, which is a continuation of U.S. patent application Ser. No. 12/214,818, filed Jun. 22, 2008, entitled "Methods and Systems of Automatically Generating Marks in a Graphical View," now U.S. Pat. No. 8,860,754, each of which is hereby incorporated by reference in its entirety.

This application is related to U.S. patent application Ser. No. 11/005,652, filed Dec. 2, 2004, entitled "Computer Systems and Methods for Visualizing Data with Generation of Marks," now U.S. Pat. No. 7,800,613, which is hereby incorporated by reference in its entirety.

TECHNICAL FIELD

The disclosed embodiments relate generally to generating graphical views of data, and more specifically to automatically generating marks in a graphical view.

BACKGROUND

Graphical views provide user-friendly ways to analyze how data varies with respect to one or more parameters. In some graphical views, variation of data with respect to one or more parameters is illustrated by varying one or more visual properties of marks that correspond to respective data points. For example, marks that cover respective specified areas in a graphical view, which are referred to as area marks, may have colors or patterns that vary based on values of corresponding data. In another example, point marks displayed at distinct locations in a graphical view may have sizes that vary based on values of corresponding data. Sometimes a "graphical view" is referred to as a "data visualization."

Map views provide an intuitive way to examine geographical variation of data. Two common examples of map views are choropleth maps, which are also referred to as filled maps, and proportional symbol maps. For choropleth maps, the marks are colors or patterns used to fill respective geographical regions; these marks are examples of area marks. For proportional symbol maps, symbols displayed at respective geographical locations vary by size in proportion to values of a parameter at the respective geographical locations or corresponding regions. These symbols are examples of point marks. A map view is one data visualization type. Other data visualization types include charts, such as bar charts.

There is a need for user-friendly software to generate graphical views of data, such as map views. In particular, a user may desire to associate data with one or more visual mark properties and in response have appropriate symbols be displayed automatically. The user also may desire to modify the association of data with visual mark properties and have the graphical view update automatically.

SUMMARY

In some embodiments, a computer-implemented method of generating marks in a graphical view includes receiving a first user request to associate a first field name with a first visual mark property. In response to the first user request, area marks are displayed in a graphical view. Respective area marks correspond to respective values of a first field corresponding to the field name. A second user request is received to associate the first field name with a second visual mark property. In response to the second user request, point marks are displayed in the graphical view. Respective point marks correspond to respective records in a retrieved result set.

In other embodiments, a system for generating marks in a graphical view includes memory, one or more processors, and one or more programs stored in the memory and configured for execution by the one or more processors. The one or more programs include instructions to receive a first user request to associate a first field name with a first visual mark property and instructions to display, in response to the first user request, area marks in a graphical view. Respective area marks correspond to respective records in a retrieved result set. The one or more programs also include instructions to receive a second user request to associate the first field name with a second visual mark property and instructions to display, in response to the second user request, point marks in the graphical view. Respective point marks correspond to respective records in the retrieved result set.

In yet other embodiments, a computer readable storage medium stores one or more programs for use in generating marks in a graphical view. The one or more programs are configured to be executed by a computer system and include instructions to receive a first user request to associate a first set of data samples with a first visual mark property and instructions to display, in response to the first user request, area marks in a graphical view. Respective area marks correspond to respective data samples in the first set. The one or more programs also include instructions to receive a second user request to associate the first set of data samples with a second visual mark property and instructions to display, in response to the second user request, point marks in the graphical view. Respective point marks correspond to respective data samples in the first set.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a conceptual block diagram of an example dataset having multiple fields in accordance with some embodiments.

FIG. 2 is a conceptual block diagram of an example table generated from a dataset in accordance with some embodiments.

Like reference numerals refer to corresponding parts throughout the drawings.

DESCRIPTION OF EMBODIMENTS

Figure 3A:
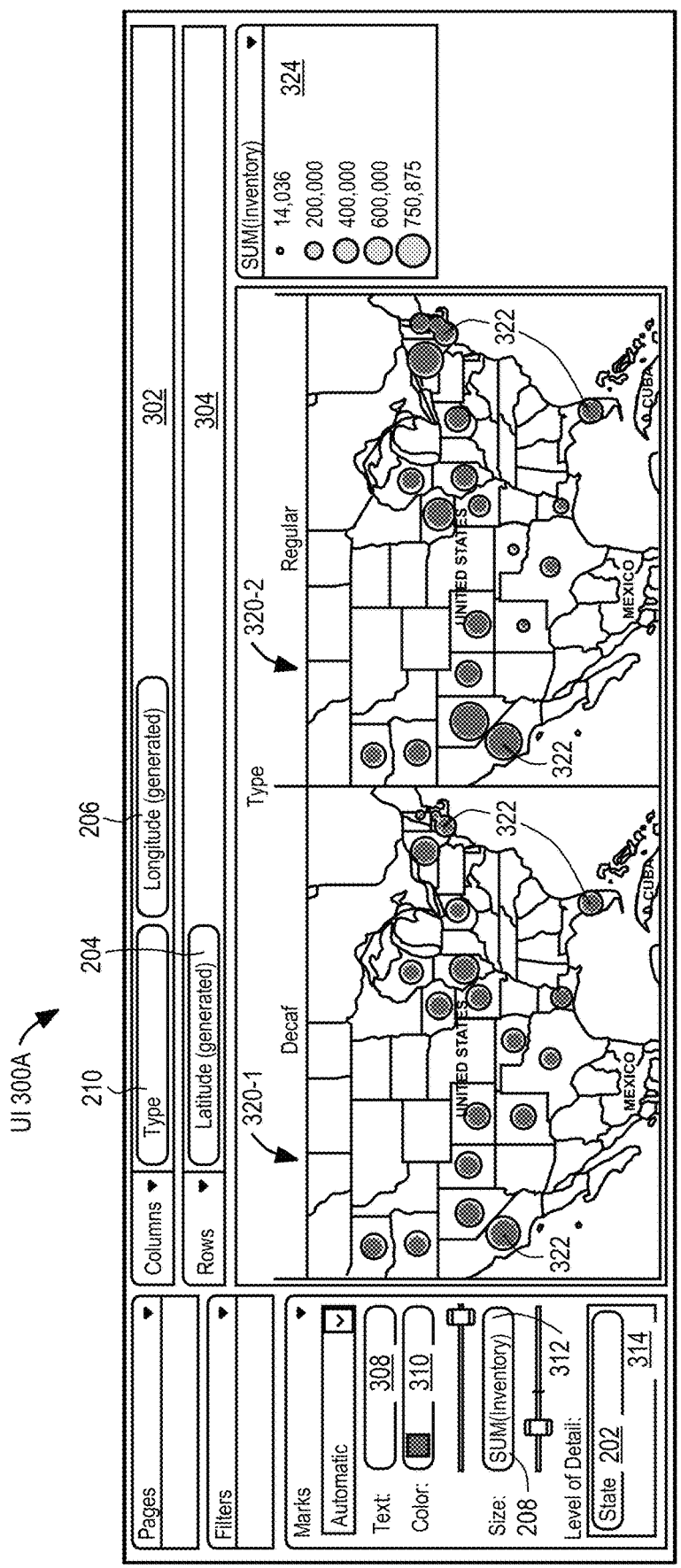
FIGS. 3A-3C are screenshots of a user interface for displaying map views in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

To generate graphical views such as map views, a user first accesses a dataset containing data to be analyzed. The dataset includes one or more fields, including fields with data to be analyzed and, in some embodiments, fields with corresponding geographical information. The geographical information specifies geographical areas (e.g., regions or locations) corresponding to the data to be analyzed. For example, the geographical information may include one or more of the following fields: country; state or province; state or provincial capital; county or parish; Metropolitan Statistical Area (MSA); Core Based Statistical Area (CBSA); Designated Market Area (DMA); arbitrarily defined market region; school, congressional, or other district; address; city; street; street number; and ZIP code or other postal code. In some embodiments the geographical information is stored using Federal Information Processing Standards (FIPS) codes. Inclusion of fields specifying geographical areas allows data to be analyzed with respect to the specified geographical areas, thus permitting the user to see variation of raw data, or of parameters calculated from raw data, across the specified geographical areas. Geographical variation may be analyzed using map views or any other appropriate graphical views (e.g., a bar chart with separate bars for distinct geographical areas).

In some embodiments, the dataset includes location fields containing coordinates associated with one or more geographical fields, to enable creation of map views. For example, the location fields may specify latitude and longitude values or any other set of coordinates capable of being mapped. A dataset with location fields that contain coordinates is said to be geocoded. If the dataset accessed by a user is not geocoded, the dataset may be geocoded by adding appropriate location fields. Alternatively, a result set generated by querying the dataset for data to be displayed in a map view may be geocoded by adding appropriate location fields to the result set. In some embodiments, location fields may be added to the dataset or result set through a join operation with a table that includes coordinates for geographical areas listed in the dataset. For example, if the dataset or result set includes a "state" field, the dataset or result set may be geocoded by performing a join operation with a table that lists latitude and longitude values for each state (e.g., the latitude and longitude of the center of each state). In some embodiments, location fields may be manually added to the dataset or result set.

The dataset may be stored in any appropriate arrangement and location. For example, the dataset may be stored in a table or in a database containing multiple tables. The database may be stored locally or remotely.

FIG. 1 is a conceptual block diagram of an example dataset 100 having multiple fields 102 through 118 in accordance with some embodiments. The dataset 100 is shown as a single table for visual clarity but in some embodiments may correspond to multiple tables in a database or to any other appropriate arrangement. The dataset 100 includes records 122-1 through 122-12 listing data for a hypothetical coffee business with stores throughout the country. Each record 122 corresponds to a particular store, as specified by a store ID 102, and a particular type of coffee 118 (e.g., regular or decaf). Each record 122 includes an inventory 116 for a type of coffee at each store and includes several fields of geographical information, such as the city 104, state 106, ZIP code 108, and geographical market 114 for each store. In addition, the dataset 100 is geocoded: each record 122 includes latitude and longitude fields 110 and 112 for the corresponding store. In addition to the fields 102 through 118 shown in FIG. 1, the dataset 100 could include other fields. For example, the dataset 100 could include additional business data (e.g., sales and profits) for each combination of store 102 and coffee type 118 and additional fields of geographical information (e.g., street and street number of each store). The dataset 100 also could include additional sets of latitude and longitude fields: for example, a first set of latitude and longitude fields could have values corresponding to cities listed in the dataset and a second set of latitude and longitude fields could have values corresponding to states listed in the dataset.

To create a graphical view for analyzing the data in the dataset 100, a result set 200 is generated from the dataset 100. In some embodiments, generating the result set includes aggregating data in the dataset 100. For example, a sum or average of inventory could be calculated by geographical area (e.g., for each city 104, state 106, zip code 108, or market 114). The sum or average could be calculated for each coffee type 118 or could be a total sum or average. A count of records for each combination of store ID 102 and a specified coffee type 118 could be calculated by geographical area, thus indicating the number of stores in each geographical area. Maximum or minimum inventory levels per store ID 102 could be calculated by geographical area. The result set 200 corresponds to one or more fields, such as the inventory field 116, in the dataset 100.

To perform these or similar calculations, the dataset 100 is queried and the relevant data is retrieved from the dataset 100 in response to the query. In some embodiments, the retrieved data is processed by geographical area, as specified by the user. If a map view is to be generated, the relevant latitude 110 and longitude 112 values also are retrieved or otherwise added to the result set. In some embodiments, if the dataset 100 includes a single relevant record for each specified geographical area, raw data from the dataset 100 may be displayed in a map view. Therefore, in some cases, the result set 200 is just a selection of fields from the dataset 100. In some cases, corresponding latitude 110 and longitude 112 fields are added to the result set 200 by joining the dataset with another table.

FIG. 2 is a conceptual block diagram of an example result set 200 containing data from the dataset 100 in accordance with some embodiments. The result set 200 (which is a table), is generated in response to instructions to sum the inventories 116 listed in the dataset 100 by state 106 and coffee type 118. The result set 200 includes fields specifying the state 202 and coffee type 210, a field containing the total inventory 208 for each combination of state 202 and coffee type 210, and corresponding latitude and longitude fields 204 and 206 for the state 202. The result set 200 includes records 220-1 through 220-10 for the various combinations of state 202 and coffee type 210. The latitude and longitude fields 204 and 206 may be generated from the dataset 100 or separately added to the result set 200 (e.g., using a join operation with a table that includes coordinates for states).

FIG. 3A is a screenshot of a user interface (UI) 300A for displaying graphical views such as map views in accordance with some embodiments. The user interface 300A enables the user to specify a result set 200 to be generated from the dataset 100 and to specify how to display the result set in one or more map views 320. The UI 300A includes user input fields for specifying the characteristics of a desired data visualization, including what data will be displayed and how the data will be displayed. In some embodiments, the user input fields are referred to as "shelves" or "user input regions." To avoid confusion with "fields" in a dataset or result set, the terms "shelf" and "shelves" will be used when referring to a user input field in a user interface.

Figure 3B:
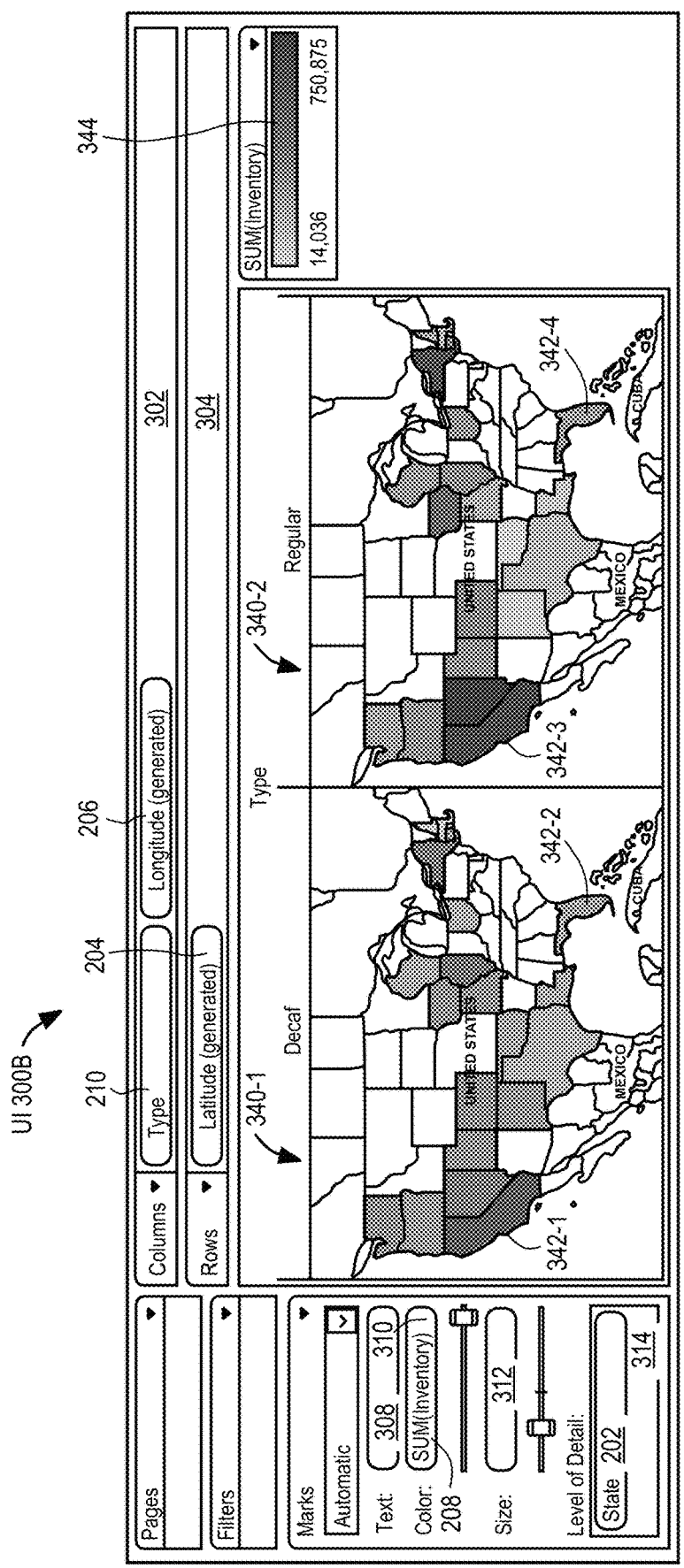
Figure 3C:
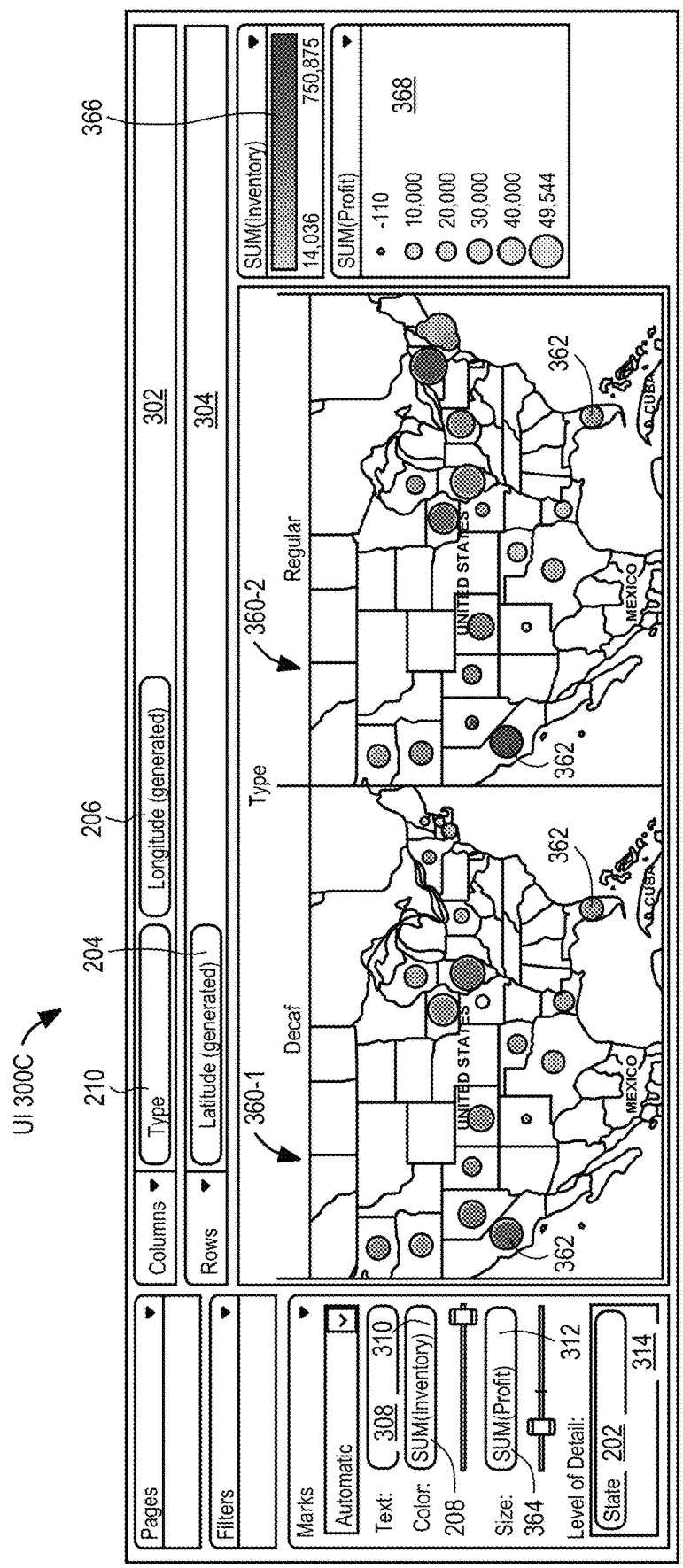

As illustrated in FIGS. 3A-3C, various field names may be placed onto the shelves, such as the field name "type" 210 on the columns shelf 302 in FIG. 3A and the "State" field name 202 on the level of detail shelf 314 in FIG. 3A. In addition, some embodiments allow a user to place an expression or formula onto a shelf, such as the expression "SUM(Inventory)" 208 on the size encoding shelf 312 in FIG. 3A and the expression "SUM(Profit)" 364 on the size encoding shelf 312 in FIG. 3C. Expression can use various combinations of field names and aggregation operators such as SUM. As illustrated in FIG. 2, an expression using one or more field names from the dataset 100 may create a field in the result set 200 (e.g., SUM(Inventory) 208). Because of this, the term "field name" may be used to identify individual fields in the dataset 100, an expression that includes one or more field names from the dataset 100, or to identify fields in the result set 200 (which may be computed based on an expression).

In some embodiments, the UI 300A includes a "columns" shelf 302, a "rows" shelf 304, and a "level of detail" shelf 314. The UI 300A also includes shelves for specifying visual properties of marks to be displayed in the one or more map views 320, including a mark text shelf 308, color shelf 310, and size shelf 312. In some embodiments, the UI 300A also includes a mark shape shelf (not shown), mark pattern shelf (not shown), mark edge/boundary shelf (not shown), and/or mark orientation shelf (not shown). Each of these shelves corresponds to a particular mark visual property. The term "visual property" as used herein does not encompass mark type (e.g., whether a mark is displayed as a point or as a filled area). In some embodiments, the visual property shelves (e.g., shelves 308, 310, and 312) are referred to as "encoding" shelves, and the process of assigning a field name to such a shelf is referred to as "visual encoding."

Assigning x-axis mapping coordinates such as longitude 206 to the columns shelf 302 (which specifies the x-position of the marks) and y-axis mapping coordinates such as latitude 204 to the rows shelf 304 (which specifies the y-position of the marks) indicates that a map view, as opposed to another type of graphical view, is to be generated. Additionally, adding coffee type 210 to the columns shelf 302 indicates that two map views 320-1 and 320-2 are to be generated, one for each coffee type (Decaf or Regular). Adding "SUM(Inventory)" 208 to the mark size shelf 312 specifies that the size of each mark is to correspond to respective values of "SUM(Inventory)" 208. Adding "state" 202 to the level-of-detail shelf 314 specifies that the "SUM(Inventory)" quantity 208 is to be calculated on a per-state basis and that a separate mark is to be displayed for each state in the dataset 100.

The dataset 100 is queried based on the selections on the shelves to create a result set 200. One or more geographical maps is displayed in the UI 300A, and marks are generated on the map(s) corresponding to the result set 200. The geographical map(s) selected for display corresponds to the geographical area or areas specified on the level-of-detail shelf 314. For example, in UI 300A, maps of the United States are displayed, because the field name "State" 202 is specified on the level-of-detail shelf 314.

A mark 322 is displayed for each state for which the dataset 100 includes inventory data. The type of mark displayed in the map views 320-1 and 320-2 is determined based on the contents of the shelves 308, 310, and 312 for specifying mark visual properties. In the UI 300A, the marks are symbols, as determined by a rule that symbol marks are to be displayed when data is specified on the mark size shelf 312. This determination of mark type spares the user from having to specify mark type. Indeed, the user can generate appropriate map views without knowing about different mark types. The size of each mark 322 corresponds to the expression "SUM(Inventory)" 208, which identifies a field 208 of the result set 200 and illustrated in the key 324. In this example, the size of each mark is proportional to the quantity SUM(Inventory), such that mark sizes increase with increasing values, as illustrated in the key 324.

In some embodiments, the user does not need to add longitude 206 to the columns shelf 302 or latitude 204 to the rows shelf 304 to specify that a map view is to be generated. Instead, if a geographical field name (e.g., "State" 202) is added to the level-of-detail shelf 314, the system determines that a map view is to be generated and automatically adds longitude 206 to the columns shelf 302 and latitude 204 to the rows shelf 304. In some embodiments, whether a field is geographical is specified in the schema of the dataset 100.

A user viewing the map views 320-1 and 320-2 (which are proportional symbol maps) may desire to transition to different map views. For example, the user may desire to transition from display of proportional symbol maps to display of choropleth maps (i.e., maps in which regions are filled by colors or patterns), to transition from display of marks of varying size to marks of varying color, or simply to try an alternate view. To accomplish this transition, the expression "SUM(Inventory)" 208 is removed from the mark size shelf 312 and added to the mark color shelf 310, as illustrated in UI 300B. In response, the symbols 322 are removed from the displayed map and replaced with fill colors 342 (e.g., 342-1 and 342-3 for California, and 342-2 and 342-4 for Florida), resulting in map views 340-1 and 340-2. The map views 340-1 and 340-2 show choropleth maps with area marks 342, as opposed to the proportional symbol maps of map views 320-1 and 320-2 (FIG. 3A). The use of area marks 342 is determined based on a rule that area marks are to be displayed when data is specified on the mark color shelf 310 and not on the mark size shelf 312. The fill color of each mark 342 corresponds to the quantity SUM(Inventory), as illustrated in the key 344. In this example, the fill colors 342 are shades of green with darkness proportional to the quantity SUM(Inventory), such that darker shades correspond to larger values.

Marks displayed in a map view may have multiple respective visual properties that vary based on multiple respective fields or expressions. For example, a mark's color may vary based on a first expression and its size may vary based on a second expression, as illustrated in the UI 300C. The UI 300C follows from the UI 300B by leaving the expression "SUM(Inventory)" 208 on the mark color shelf 310, leaving "State" 202 on the level-of-detail shelf 314, and adding the expression "SUM(Profit)" 364 to the mark size shelf 312. This example assumes that the dataset 100 includes a "Profit" field. In response, display of the marks 342 ceases, a result set including the fields "SUM(Inventory)" and "SUM(Profit)" is created, and marks 362 are displayed in the map views 360-1 and 360-2. The marks 362 are symbols with sizes that vary based on values of SUM (Profit) 364, as illustrated in the key 368, and colors that vary based on values of SUM(Inventory), as illustrated in the key 366. The use of symbols for the marks 362 is determined based on a rule that symbol marks are to be displayed when data is specified on the mark size shelf 312, regardless of whether or not data is specified on the mark color shelf 310.

The UIs 300A-300C thus allow a user to transition between map views by modifying the contents of mark specification shelves 308, 310, and 312, in response to which the type of mark to be displayed is selected based on a set of rules. In some embodiments the UIs 300A-300C also enable a user to transition between a map view and another type of graphical display. For example, a user viewing the map views 320-1 and 320-2 in the UI 300A may desire to view another type of graphical view (e.g., a chart) of inventory by state instead. In some embodiments, this transition is achieved by modifying the field names on the columns shelf 302 and rows shelf 304 and/or on the mark specification shelves 308, 310, and 312. For example, the user may delete longitude 206 from the columns shelf 302 and latitude 204 from the rows shelf 304, in response to which the map views 320-1 and 320-2 are replaced with another type of graphical view. The shelves 302, 304, and 314 and shelves 308, 310, and 312 thus may be used to generate both map views and other types of graphical views.

Figure 4:
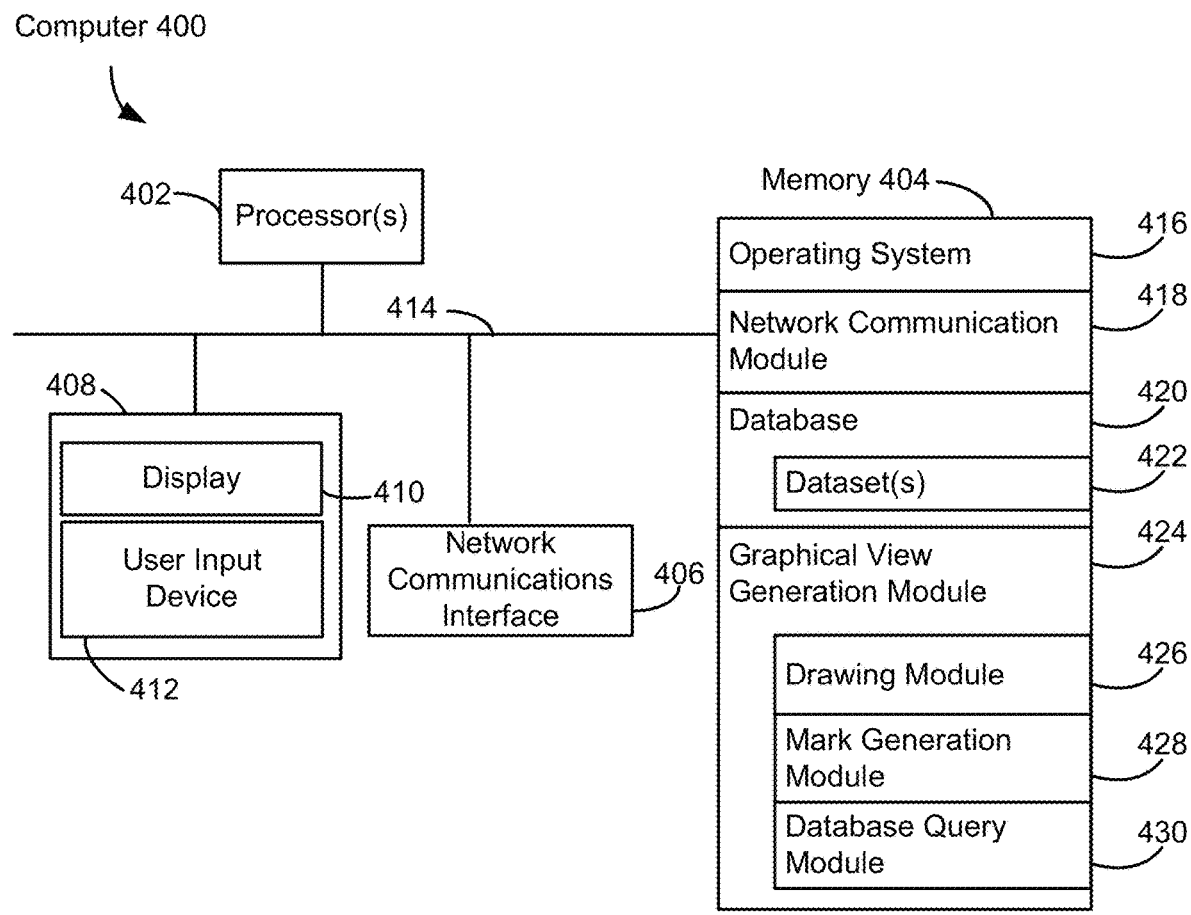
FIG. 4 is a block diagram illustrating a computer system for generating graphical views in accordance with some embodiments.

FIG. 4 is a block diagram illustrating a computer system 400 for generating graphical views in accordance with some embodiments. The computer system 400 typically includes one or more processors 402, one or more network or other communications interfaces 406, memory 404, and one or more communication buses 414 for interconnecting these components. The one or more network or other communications interfaces 406 allow transmission and reception of data and instructions through a network connection. The communication buses 414 may include circuitry (sometimes called a chipset) that interconnects and controls communications between system components. The computer system 400 may also include interface devices 408, such as a display device 410 and a user input device 412. User interface images (e.g., UIs 300A-300C) may be displayed on the display device 410 under the control of the graphical view generation module 424, described below. Examples of user input devices 412 include a keyboard, mouse, trackball, touchpad, or touch screen. Memory 404 includes high-speed random access memory, such as DRAM, SRAM, DDR RAM or other random access solid-state memory devices, and may include non-volatile memory, such as one or more magnetic disk storage devices, optical disk storage devices, flash memory devices, or other non-volatile solid-state storage devices. Memory 404 may optionally include one or more storage devices remotely located from the processor(s) 402. Memory 404, or alternately the non-volatile memory device(s) within memory 404, comprises a computer readable storage medium. In some embodiments, memory 404 stores the following programs, modules, and data structures, or a subset thereof:
- an operating system 416 that includes procedures for handling various basic system services and for performing hardware-dependent tasks;
- a network communication module 418 that is used for connecting the computer system 400 to other computers via the one or more communication network interfaces 406 and one or more communication networks, such as the Internet, wide area networks, local area networks, metropolitan area networks, and the like;
- a database 420 that includes one or more datasets 422 (e.g., one or more datasets 100); and
- a graphical view generation module 424 for generating graphical views (e.g., map views) based on data from the one or more datasets 422. In some embodiments, the graphical view generation module 424 includes instructions to perform the method 500. The graphical view generation module 424 is also referred to as a "data visualization application."

In some embodiments, the database 420 is stored externally to the computer system 400. For example, the database 420 may be stored on a server in communication with the computer system 400 through a network.

In some embodiments, the data visualization application 424 includes a drawing module 426 for selecting and displaying a type of graphical view; a mark generation module 428 for determining mark types, appearances, and locations and generating corresponding marks on a graphical view; and a database query module 430 for querying a dataset 422 to generate a result set corresponding to one or more fields in the dataset 422.

In some embodiments, instructions corresponding to all or a portion of the graphical view generation module 424 are stored at and executed by a server that transmits the results to the computer system 400 for display.

Each of the above identified elements 416-430 in FIG. 4 may be stored in one or more of the previously mentioned memory devices. Each of the above identified modules corresponds to a set of instructions for performing a function described above. The above identified modules or programs (i.e., sets of instructions) need not be implemented as separate software programs, procedures, or modules, and thus various subsets of these modules (or sets of instructions) may be combined or otherwise re-arranged in various embodiments. In some embodiments, memory 404 may store a subset of the modules and data structures identified above. Furthermore, memory 404 may store additional modules and data structures not described above.

Figure 5:
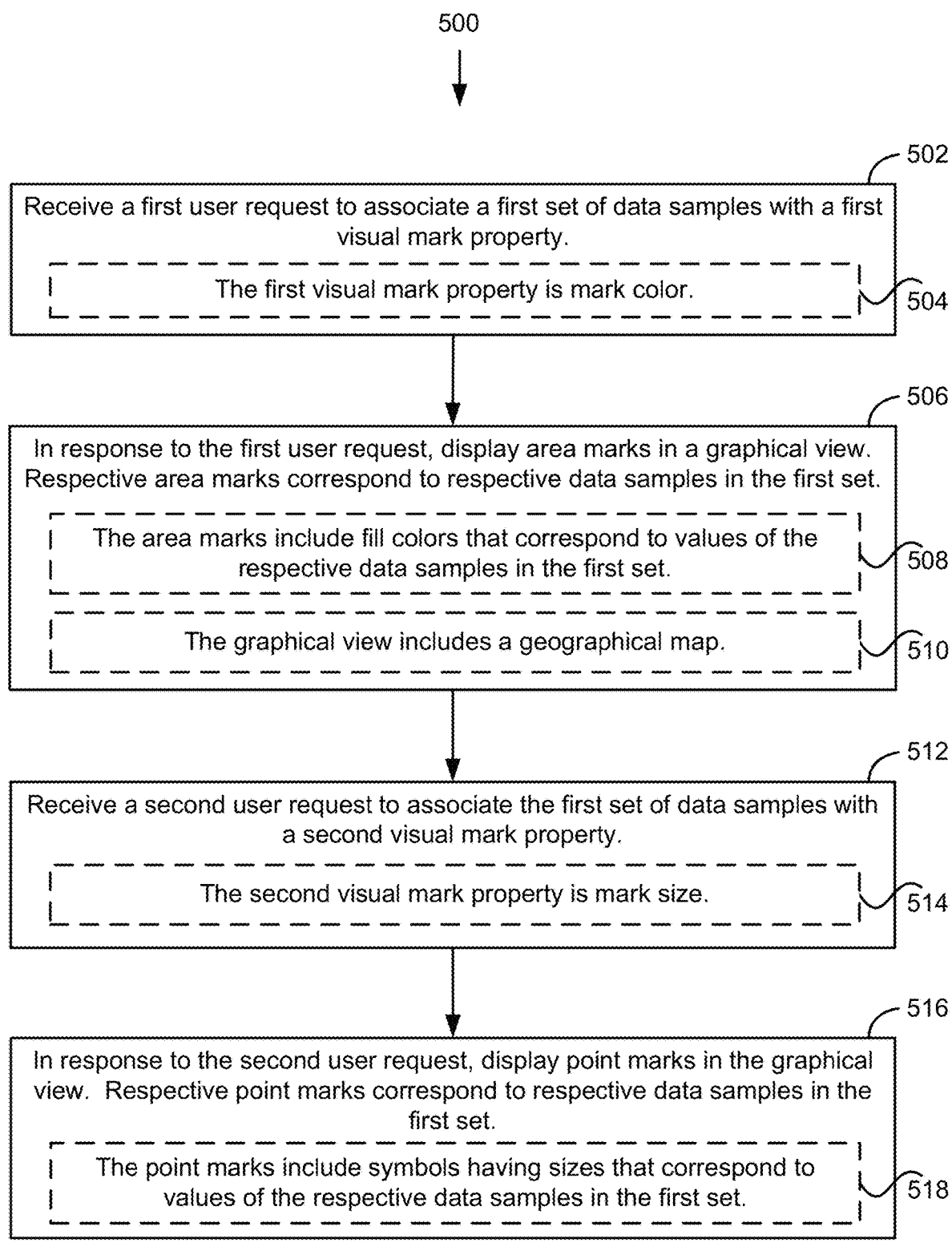
FIG. 5 is a flow diagram illustrating a method of generating marks in a graphical view in accordance with some embodiments.

FIG. 5 is a flow diagram illustrating a computer-implemented method 500 of generating marks in a graphical view in accordance with some embodiments. In some embodiments, the method 500 is performed at a computer system 400 by executing instructions associated with the data visualization application 424. Alternatively, some operations in the method 500 are performed at a server in communication with the computer system 400.

A first user request is received (502) to associate a first field name with a first visual mark property. In some embodiments, the first visual mark property is (504) mark color. For example, in the UI 300B, "SUM(Inventory)" 208 is added to the mark color shelf 310, thus associating "SUM(Inventory)" 208 with mark color. Alternatively, the first visual mark property may be mark pattern, such as the patterns used to fill respective marks.

In response to the first user request, area marks (e.g., marks 342-1 through 342-4) are displayed (506) in a graphical view (e.g., map view 340-1 or 340-2). Respective area marks correspond to respective records in a retrieved record set.

In some embodiments, the area marks include fill colors that correspond (508) to values of the respective field in the record set. For example, in UI 300B the shade of green for each mark 342 corresponds to the value of SUM(Inventory) for the corresponding state. In general, variation of color between respective marks corresponds to variation in the values of a field in the record set, and may include variation in hue, saturation, and/or brightness. The various colors used for respective marks may be various shades of a single hue, such as various shades of gray determined according to a grayscale that corresponds to values of the field. For example, the darkness of the fill color may increase with increasing data values. Alternatively, the darkness of the fill color may decrease with increasing data values. Two or more hues could be used, with each hue corresponding to a distinct range of data values and the darkness of each fill color increasing for increasing data values within each range.

In some embodiments, the area marks include fill patterns that correspond to respective data values. For example, distinct fill patterns may correspond to distinct values. In another example, the density of the fill pattern may either increase or decrease with increasing data values.

In some embodiments, the graphical view includes (510) a geographical map (e.g., the map of the United States in map view 340-1 or 340-2).

A second user request is received (512) to associate the first field name with a second visual mark property. In some embodiments, the second visual mark property is (514) mark size. For example, in the UI 300A, "SUM(Inventory)" 208 is added to the mark size shelf 312, thus associating "SUM (Inventory)" 208 with mark size.

In response to the second user request, point marks (e.g., symbol marks 322) are displayed (516) in the graphical view (e.g., the map views 320-1 and 320-2). Respective point marks correspond to respective records in the result set 200. In some embodiments, the point marks replace the area marks displayed in operation 506.

In some embodiments, the point marks include symbols having sizes that correspond (518) to values of the first field (corresponding to the first field name). In some embodiments, the symbols have sizes proportional to the field values. For example, sizes of the marks 322 are proportional to values of SUM(Inventory) for respective states. Alternatively, the field values may be divided into ranges and the size of each symbol is determined by the range into which its value falls, with higher ranges having larger symbol sizes.

In some embodiments in which the graphical view includes a geographical map, records in the result set are associated with respective geographical values (e.g., respective values in the "SUM(Inventory)" field 208 are associated with respective states in the "State" field 202). The area marks and point marks have display locations on the geographical map that correspond to the respective geographical values. In some embodiments, the area marks have fill colors that correspond to respective values of the first field and the point marks include symbols having sizes that correspond to values of the first field.

In some embodiments, the second user request further associates a second field name with the first visual mark property, where the first visual mark property is mark color. In response, the symbols have colors that correspond to values of the second field (corresponding to the second field name). In some embodiments, the first and second field names correspond to respective first and second fields in a dataset. For example, the request that associates "SUM (Inventory)" 208 with mark size could also associate "SUM (Profit)" 364 with mark color, resulting in display of map views with symbols for which size varies with SUM(Inventory) and color varies with SUM(Profit). FIG. 3C illustrates similar map views, but with the data associations reversed: in FIG. 3C, "SUM(Inventory)" 208 is associated with color and "SUM(Profit)" 364 with size.

In some embodiments in which the first field name corresponds to a first field of a dataset, the data corresponding to the first field name is generated from the dataset by querying the dataset (e.g., dataset 100) to retrieve data from the first field. In some embodiments, the first field is generated from the dataset by aggregating data in the first field with respect to associated geographical data (e.g., geographical data in a geographical field in the dataset, such as city 104, state 106, zip 108, or market 114, FIG. 1). Aggregating data in the first field may include, for example, calculating sums (e.g., "SUM(Inventory)" 208), averages, or counts of data in the first field for respective values of the associated geographical data. In some embodiments, the first field is generated from the dataset by calculating, for respective values of associated geographical data, maximum or minimum values of data in the first field. These options for generating the first field are also options for generating the second field.

The method 500 thus provides a user-friendly way to create graphical views without having to specify mark type explicitly. The method 500 also allows easy transitioning between different graphical views, thereby simplifying data analysis. While the method 500 includes a number of operations that appear to occur in a specific order, it should be apparent that the method 500 can include more or fewer operations and that an order of two or more operations may be changed. For example, operations 512 and 516 could precede operations 502 and 506.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a computer having a display, one or more processors, and memory storing one or more programs configured for execution by the one or more processors:
      displaying a user interface on the display that includes (i) a user-input region having a plurality of shelves and (ii) a graphical view region;
      receiving user actions to:
         associate a first field of a dataset with a first shelf, of the plurality of shelves, wherein the first shelf either (i) defines color encoding for graphical marks or (ii) defines size encoding for the graphical marks;
         associate a second field of the dataset with a second shelf of the plurality of shelves, wherein placement of the second field on the second shelf determines a number of graphical views displayed in the graphical view region, according to a count of distinct values of the second field; and
      in response to receiving the user actions:
         displaying, without further user input, the number of graphical views in the graphical view region in accordance with the first and second fields, wherein:
            each of the graphical views corresponds to a respective distinct value of the second field;
            each of the graphical views includes a set of graphical marks that overlay a respective instance of a same geographic map, displayed according to the association of the first field of the dataset with the first shelf;

each of the graphical views is displayed next to another graphical view in the graphical view region;

when the first shelf defines color encoding for graphical marks, each graphical mark has a respective color that corresponds to a respective data value associated with the first field; and when the first shelf defines size encoding for graphical marks, each graphical mark has a respective size that corresponds to a respective data value associated with the first field.

2. The method of claim 1, further comprising receiving an additional user action to associate a third field of the dataset with a third shelf of the plurality of shelves, wherein:

the third shelf defines geographic regions; and displaying the graphical views in the graphical view region is further performed in accordance with the third field.

3. The method of claim 2, further comprising selecting a geographic map for the graphical views according to the third field in response to receiving the additional user action to associate the third field with the third shelf.

4. The method of claim 1, wherein the first shelf defines size encoding for graphical marks and the respective size of each graphical mark is proportional to the respective data value associated with the first field.

5. The method of claim 1, wherein the first shelf defines color encoding for graphical marks and, for each graphical mark:

the respective data value associated with the first field is a respective quantitative value from a continuous range of quantitative values; and the respective color assigned to the graphical mark is assigned according to the respective quantitative value from the continuous range of quantitative values.

6. The method of claim 1, wherein the user interface displayed on the display further includes a schema information region with a plurality of fields of the dataset, including the first field and the second field.

7. The method of claim 6, wherein receiving user actions to associate the first and second fields with the first and second shelves comprises:

detecting selection of the first and second fields in the schema information region; and detecting dragging of each of the selected fields to the respective shelf.

8. The method of claim 1, wherein the first shelf defines color encoding for graphical marks and each of the graphical marks is a respective area mark.

9. The method of claim 1, wherein the first shelf defines size encoding for graphical marks and each of the graphical marks is a respective point mark.

10. A computer system for generating data visualizations, comprising:

a display;

one or more processors;

memory; and one or more programs stored in the memory and configured for execution by the one or more processors, the one or more programs comprising instructions for:

displaying a user interface on the display that includes (i) a user-input region having a plurality of shelves and (ii) a graphical view region;

receiving user actions to:

associate a first field of a dataset with a first shelf, of the plurality of shelves, wherein the first shelf either (i) defines color encoding for graphical marks or (ii) defines size encoding for the graphical marks;

associate a second field of the dataset with a second shelf of the plurality of shelves, wherein placement of the second field on the second shelf determines a number of graphical views displayed in the graphical view region, according to a count of distinct values of the second field; and in response to receiving the user actions:

displaying, without further user input, the number of graphical views in the graphical view region in accordance with the first and second fields, wherein:

each of the graphical views corresponds to a respective distinct value of the second field;

each of the graphical views includes a set of graphical marks that overlay a respective instance of a same geographic map, displayed according to the association of the first field of the dataset with the first shelf;

each of the graphical views is displayed next to another graphical view in the graphical view region;

when the first shelf defines color encoding for graphical marks, each graphical mark has a respective color that corresponds to a respective data value associated with the first field; and when the first shelf defines size encoding for graphical marks, each graphical mark has a respective size that corresponds to a respective data value associated with the first field.

11. The computer system of claim 10, wherein the one or more programs further comprise instructions for receiving an additional user action to associate a third field of the dataset with a third shelf of the plurality of shelves, wherein:

the third shelf defines geographic regions; and displaying the graphical views in the graphical view region is further performed in accordance with the third field.

12. The computer system of claim 11, wherein the one or more programs further comprise instructions for selecting a geographic map for the graphical views according to the third field in response to receiving the additional user action to associate the third field with the third shelf.

13. The computer system of claim 10, wherein the first shelf defines size encoding for graphical marks and the respective size of each graphical mark is proportional to the respective data value associated with the first field.

14. The computer system of claim 10, wherein the first shelf defines color encoding for graphical marks and, for each graphical mark:

the respective data value associated with the first field is a respective quantitative value from a continuous range of quantitative values; and the respective color assigned to the graphical mark is assigned according to the respective quantitative value from the continuous range of quantitative values.

15. The computer system of claim 10, wherein the user interface displayed on the display further includes a schema information region with a plurality of fields of the dataset, including the first field and the second field.

16. The computer system of claim 15, wherein receiving user actions to associate the first and second fields with the first and second shelves comprises:

detecting selection of the first and second fields in the schema information region; and detecting dragging of each of the selected fields to the respective shelf.

17. The computer system of claim 10, wherein the first shelf defines color encoding for graphical marks and each of the graphical marks is a respective area mark.

18. The computer system of claim 10, wherein the first shelf defines size encoding for graphical marks and each of the graphical marks is a respective point mark.

19. A non-transitory computer-readable storage medium storing one or more programs configured for execution by a computer system having a display, one or more processors, and memory, the one or more programs comprising instructions for:

displaying a user interface on the display that includes (i) a user-input region having a plurality of shelves and (ii) a graphical view region;

receiving user actions to:
associate a first field of a dataset with a first shelf, of the plurality of shelves, wherein the first shelf either (i) defines color encoding for graphical marks or (ii) defines size encoding for the graphical marks;

associate a second field of the dataset with a second shelf of the plurality of shelves, wherein placement of the second field on the second shelf determines a number of graphical views displayed in the graphical view region, according to a count of distinct values of the second field; and in response to receiving the user actions:

displaying, without further user input, the number of graphical views in the graphical view region in accordance with the first and second fields, wherein:

each of the graphical views corresponds to a respective distinct value of the second field;

each of the graphical views includes a set of graphical marks that overlay a respective instance of a same geographic map, displayed according to the association of the first field of the dataset with the first shelf;

each of the graphical views is displayed next to another graphical view in the graphical view region;

when the first shelf defines color encoding for graphical marks, each graphical mark has a respective color that corresponds to a respective data value associated with the first field; and when the first shelf defines size encoding for graphical marks, each graphical mark has a respective size that corresponds to a respective data value associated with the first field.

20. The non-transitory computer-readable storage medium of claim 19, wherein the one or more programs further comprise instructions for receiving an additional user action to associate a third field of the dataset with a third shelf of the plurality of shelves, wherein:

the third shelf defines geographic regions; and displaying the graphical views in the graphical view region is further performed in accordance with the third field.

\* \* \* \* \*